Draftsman
22
A. Atwood.
Fulling Machine.
No 6094X Patented Oct. 1, 1830.
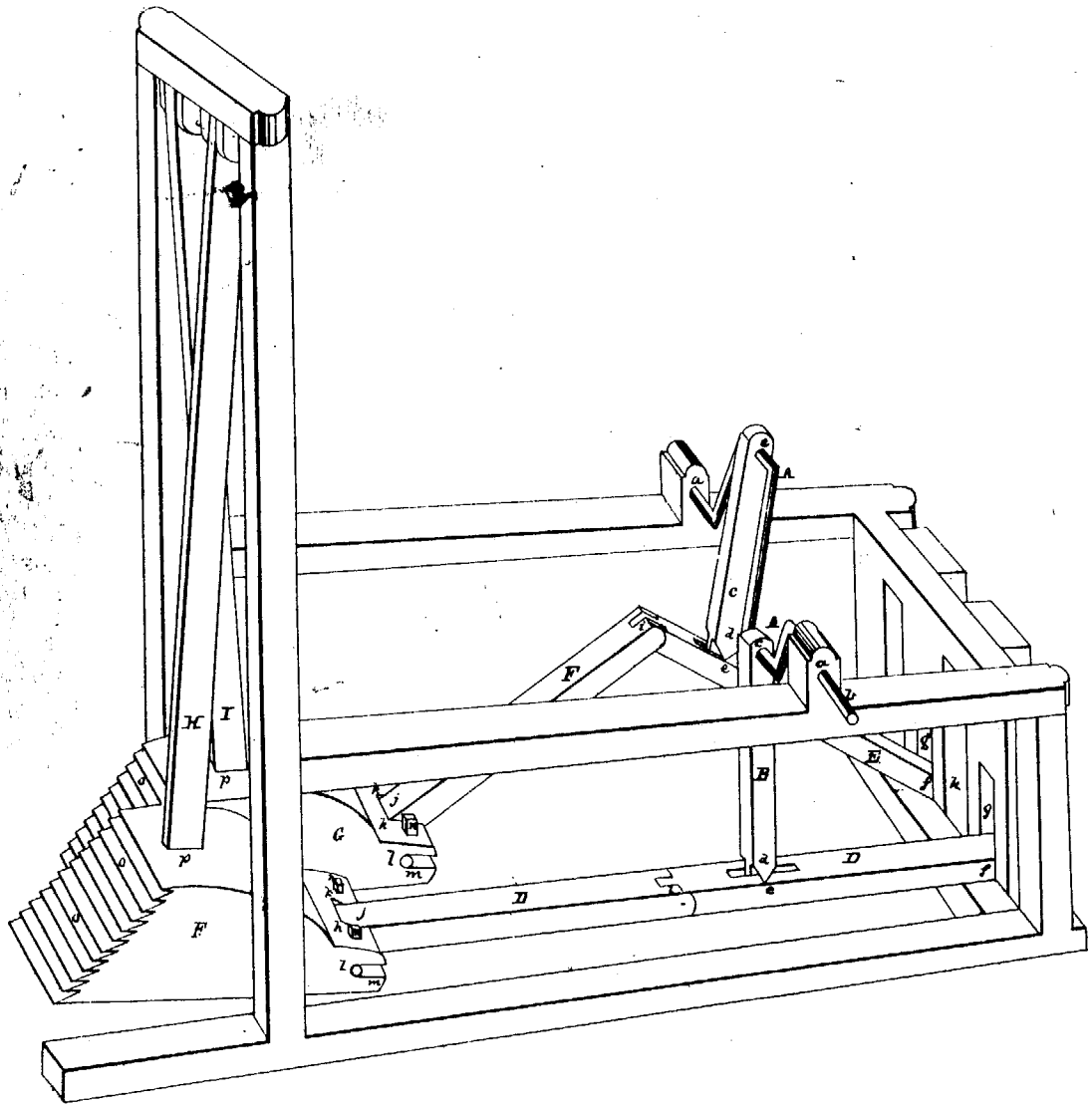

Anson Alwood of Salem New York.

Letters Patent

The schedule referred to in these Letters Patent and making part of the same
containing a description in the words of the said Anson Alwood himself
of his improvement in Fulling Mills and Power Looms.

To all to whom these presents may come. Be it Known that I Anson
Alwood of Salem in the County of Washington and State of New York.
have invented a new and useful improvement in the construction of
Fulling mills and Power Looms and that the following is a full and ex-
-act description of the nature of said improvement its construction and
operation as invented and applied by me.

It is usual in Fulling Mills to connect each hammer to the crank
by means of an iron rod, or a stick of timber called a pitman; I
propose introducing between the hammer and the Crank, what some wri-
ters call the "Engine of oblique action". This is done by using a short pit-
man, and connecting it with the hammers by a compound lever. one end
of this compound lever is fastened to the hammer and the other end is fix-
-ed by a moddle pin to the frame of the mill. Near the Centre of the lever
is a rolling joint, and at the joint, or between it and the fixed end of
the lever I attach the pitman reaching from the crank. The joint is
similar to those in the arms of a carriage top and is furnished with a
moddle pin The advantages of this improvement are a gain of power
and a more gradual and equable motion of the hammers, better condu-
-cing to the felting of cloth, also a diminution of expense, in crank and
gearing and repairs. To the Power Loom I apply my improvement for
the purpose of giving the cloth a firmer texture, by giving two blows instead
of one in beating it up. This I do by a compound jointed lever (similar
to that used in the fulling mill) with one end attached to the Lathe and
the other end to a pin on one of the posts of the loom. This lever is moved
by a crank or cam wheel. The end of the lever attached to the post
must be furnished with a screw bolt and nut and a groove in the post

[illegible]

allowing the lever to be elevated or depressed at pleasure so as to secure two blows upon every thread of filling. In the fulling mill which I have put in operation upon this Plan in the Town of Hebron the length of the upper lever is six feet. the joint exactly in the middle. the pitman uniting with the lever seventeen inches from the joint. thus giving the hammer a proper motion upon a crank of ten inches sweep.

What I claim as new and as my own invention and is the application of a compound jointed lever or the engine of oblique action to a fulling mill and Power Loom I consider the construction and application as above set forth wholly my own and I claim the exclusive right of using the same together with the whole advantage derivable therefrom.

Witnesses
Jas Stevenson Jr
Henry W Dodd

Anson Atwood

[illegible]
[illegible] 6245 [illegible]

Patented 1st October 1830